METHOD AND APPARATUS FOR ORIENTING PAD-LIKE ARTICLES

Original Filed April 28, 1967 5 Sheets-Sheet 1

INVENTOR
LOUIS F. PORCARO
Hubbard & Quillian
BY Dale Ross Quillian
ATTORNEY

METHOD AND APPARATUS FOR ORIENTING PAD-LIKE ARTICLES

Original Filed April 28, 1967 5 Sheets-Sheet 2

METHOD AND APPARATUS FOR ORIENTING PAD-LIKE ARTICLES

Original Filed April 28, 1967 5 Sheets-Sheet 3

METHOD AND APPARATUS FOR ORIENTING PAD-LIKE ARTICLES
Original Filed April 28, 1967 5 Sheets-Sheet 4
FIG. 5.
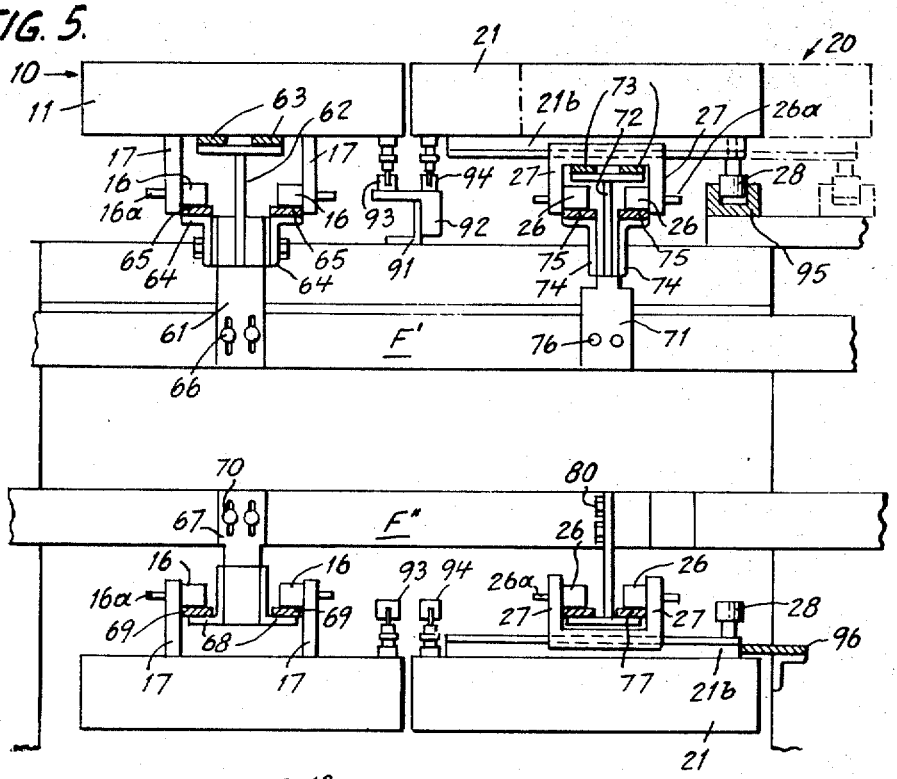
FIG. 7.
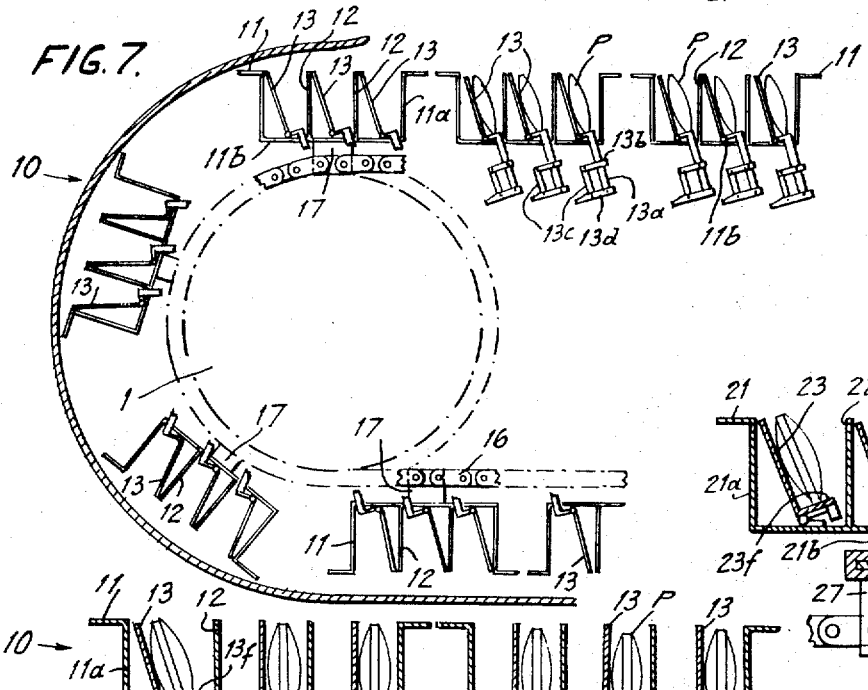
FIG. 10.
FIG. 11.
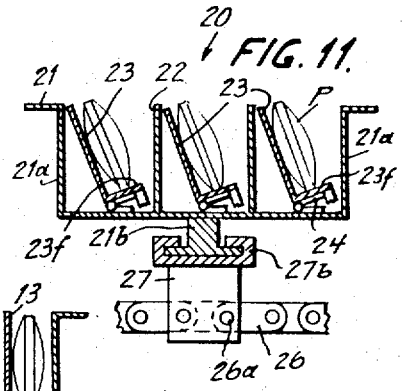

METHOD AND APPARATUS FOR ORIENTING PAD-LIKE ARTICLES

Original Filed April 28, 1967 5 Sheets-Sheet 5

United States Patent Office

Re. 27,190
Reissued Oct. 19, 1971

27,190
METHOD AND APPARATUS FOR ORIENTING PAD-LIKE ARTICLES

Louis F. Porcaro, Chicago, Ill., assignor to Miles Laboratories, Inc., Elkhart, Ind.

Original No. 3,409,115, dated Nov. 5, 1968, Ser. No. 634,540, Apr. 28, 1967. Application for reissue Mar. 3, 1969, Ser. No. 807,463
Int. Cl. B65g *47/00*
U.S. Cl. 198—24 10 Claims

Matter enclosed in heavy brackets [ ] appears in the original patent but forms no part of this reissue specification; matter printed in italics indicates the additions made by reissue.

ABSTRACT OF THE DISCLOSURE

A machine and method for unscrambling a continuous stream of pad-like articles and orienting these articles into two columns of spaced rows moving at the same speed by the use of a pair of flanking conveyers which extend parallel to one another. The individual articles in these rows are upstanding and laterally aligned in their smallest dimension due to transverse open receptacles separated by closed receptacles in said conveyers, the conveyers being sufficiently offset so that the rows in each column are in lateral alignment with the spaces between the rows in the other column. The closed receptacles are then opened to form empty receptacles and the spaced rows from one column are moved laterally into the spaces in the remaining column as the conveyers move at constant speed.

Background

This invention relates to the field of unscrambling conveyers adapted to receive a steady flow of individual pad-like articles in a random and disorganized stream and arranging these articles into orderly groups for packing. This is done by having a pair of parallel flanking conveyers, said conveyers having a series of channel shaped buckets with laterally open sides, said buckets having open pockets for reception of these disorganized articles in spaced rows which extend laterally of the conveyer and then closing these pockets to thereby leave open spaces or pockets for reception of the spaced rows in the other conveyer as the two parallel conveyers move at a constant speed toward a discharge conveyer or wrapping machine.

Prior art unscramblers have not been designed or equipped to handle three-dimensional, pad-like articles of relatively flat or oval cross-sectional dimension. Moreover, these devices are not equipped to receive a continuous stream of pad-like articles from a conveyer or chute means and laterally align these articles in spaced pockets, the pockets being open during reception of the articles and then closing after reception to thereby leave corresponding spaces for intermeshing to similar rows by the use of cross-feed means.

Summary of the invention

This invention relates to both a method and apparatus for orienting and arranging random and disordered pad-like articles into upstanding groups of these articles aligned in both a lateral and longitudinal direction.

The method of this invention involves the steps of distributing articles at a constant feed rate into two parallel columns which move horizontally at the same speed in a parallel and flanking relationship, arranging these articles in the form of spaced rows, the individual articles in each row being upstanding and laterally aligned in their smallest dimension while the rows in each column are laterally aligned with the spaces in the other column, continuing to move the two parallel columns in a horizontal direction and then laterally diverting the spaced rows in one column into the corresponding spaces between the rows in the other column as the two columns move toward a common discharge point.

The apparatus useful for performing the method of this invention involves the use of a plurality of conveyor bucket means, said conveyer bucket means being arranged in parallel, flanking relationship and moving in a longitudinal direction at constant speed. The bucket means are connected to the conveyer chain so that the end walls are adjacent one another end-to-end to thereby form a longitudinal series of buckets on the conveyer. The buckets are laterally open channel-shaped buckets, have transverse fixed walls and tiltable walls positioned between the end walls of the bucket. The tiltable walls are placed intermediate the fired walls and form a series of rectangular laterally open receptacles or pockets which extend transverse of the conveyer, the full width of the conveyer when the tiltable walls are normal or perpendicular to the conveyer plane. The tiltable walls are in a slanted or open position for reception of the pad-like article onto the bucket means and are then tilted to the closed position or perpendicular to the conveyer plane after reception of the pad-like articles. The buckets in each flanking conveyer are sufficiently offset to align the open receptacles in one conveyer with the closed receptacles in the other conveyer and means are provided to move the two flanking conveyers at constant speed while cross-feed means, which also move at the same speed, are provided for laterally moving the spaced rows in one bucket conveyer between the spaced rows in the corresponding bucket conveyer to provide small groups of articles which are laterally aligned edgewise in rows and the rows themselves are longitudinally aligned. The small groups of aligned articles can then be discharged by suitable means onto a conventional packing machine conveyer having laterally open channelled buckets without receptacles in the buckets.

Brief description of the drawings

FIG. 5 is a detailed cross-sectional view of the initial portion of the unscrambler and shows the two flanking conveyer bucket means taken along lines 5—5 of FIG. 1.

FIG. 7 is a sectional side view of the initial portion of the unscrambler conveyer bucket means taken along lines 7—7 of FIG. 1.

FIG. 10 is an enlarged side view of a section of the conveyer bucket means showing the tiltable walls taken along lines 10—10 of FIG. 3.

FIG. 11 is another enlarged sectional side view of the conveyer bucket means taken along lines 11—11 of FIG. 3.

Detailed description of the preferred embodiments

Figure 1:
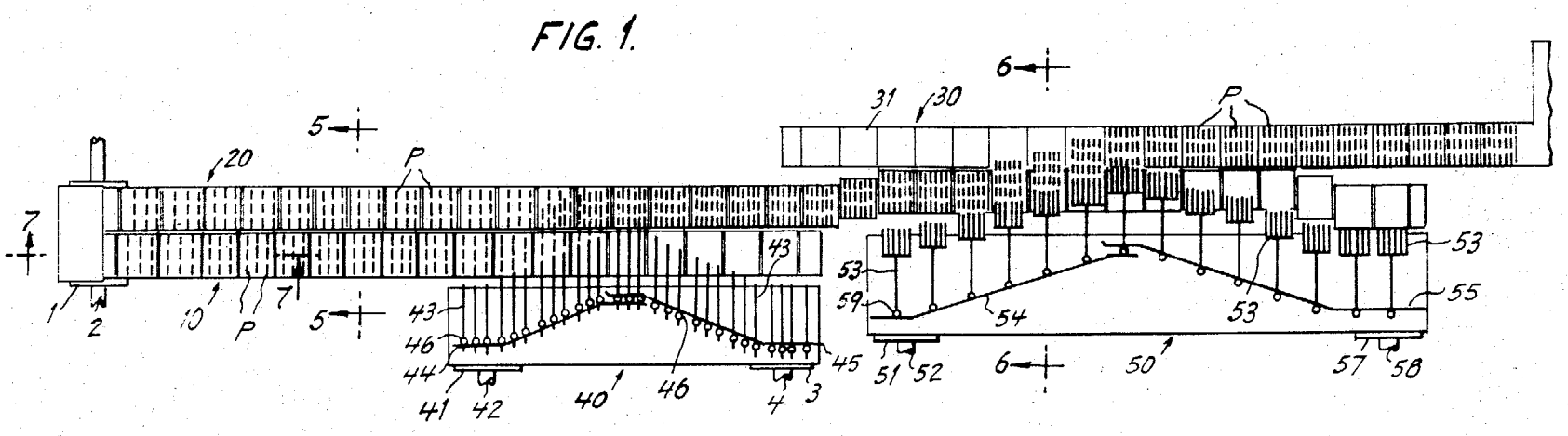
FIG. 1 is a top plan view of the unscrambler machine of this invention showing the pair of flanking parallel conveyers, the two cross-feed means and the standard packing machine bucket conveyer.
Figure 2:
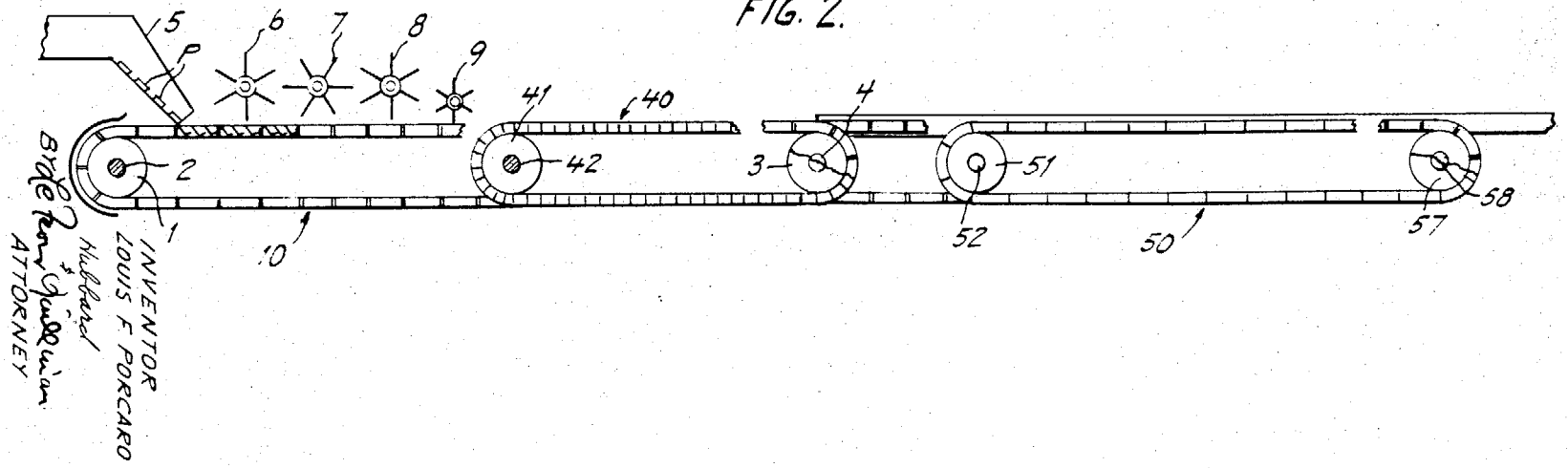
FIG. 2 is a side elevational view of the unscrambler machine and shows the relationship of the sprocket wheels for the various conveyers.
Figure 3:
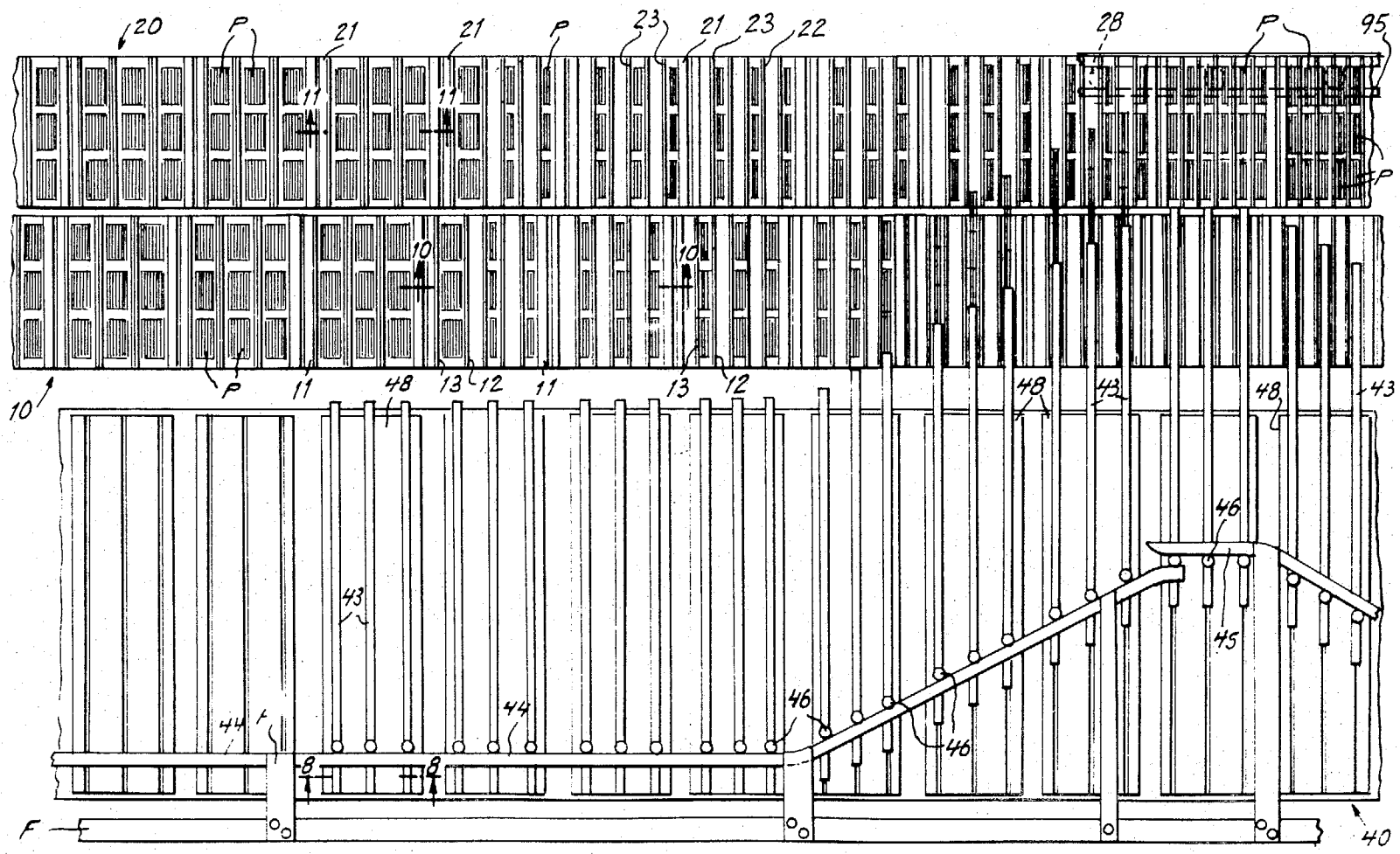
FIG. 3 is a top plan view of the first cross-feed means for transferring individual rows of articles from one flanking conveyer to the other flanking conveyer.
Figure 4:
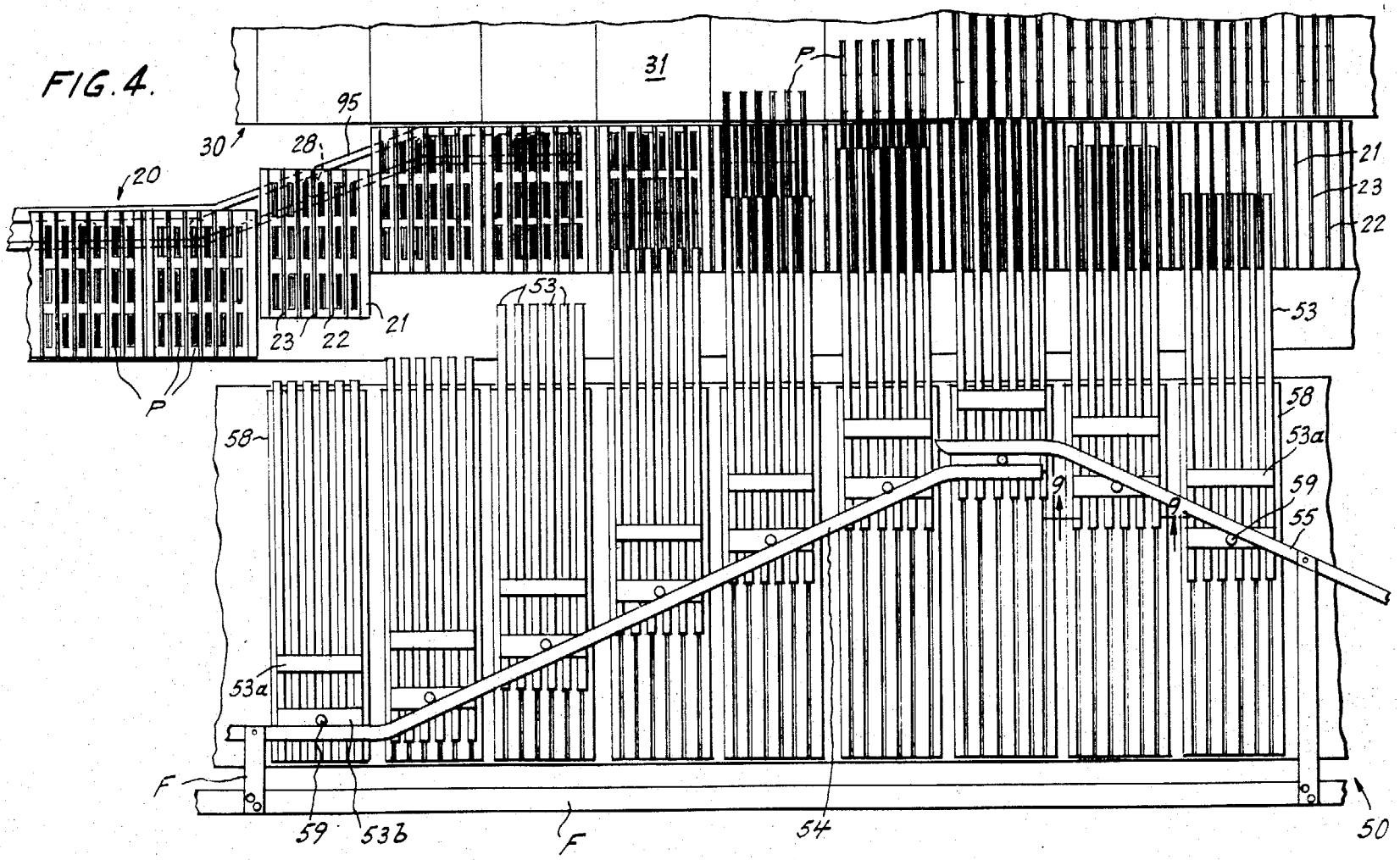
FIG. 4 is a top plan view of the second cross-fed means for transferring aligned groups of the articles from the flanking conveyer onto a standard packing machine bucket conveyer.
Figure 6:
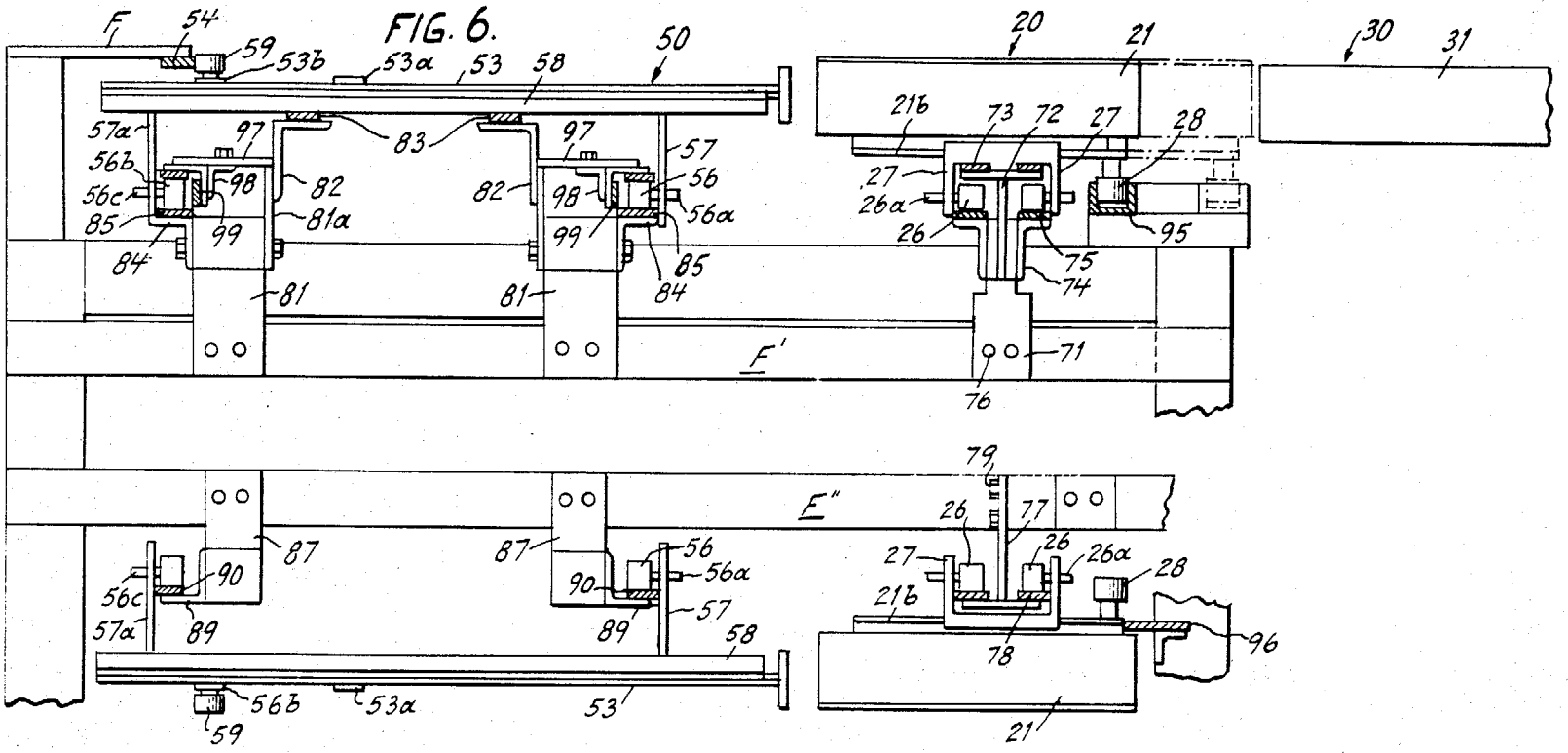
FIG. 6 is a detailed cross-sectional view of the terminal portion of the unscrambler and shows one of the flanking conveyers and the second cross-feed means taken along lines 6—6 of FIG. 1.

Referring now in detail to the above drawings which show the preferred embodiments of this invention, it is seen that FIGS. 1, 3 and 4 show top plan views of the uncrambler machine, FIG. 2 is a side view of the machine, FIGS. 5 and 6 are cross-sectional views of the machine, and FIGS. 7–11 are detailed side views of various sections of the machine.

In FIG. 1, two conveyer means 10 and 20 having a series of receptacles, are shown running parallel to a standard packing machine bucket conveyer 30, first cross-feed means 40 and second cross-feed means 50. Conveyer bucket means 10 rides around sprocket wheel 1 which is mounted on shaft 2 and is driven by sprocket wheel 3 connected to shaft 4 and electric drive means not shown. Conveyer bucket means 20 extends from sprocket wheel 1 to terminal sprocket wheel 57 which rests on shaft 58 and is also driven by wheel 3. The first cross-feed means 40 is driven by sprocket wheels 3 and 4 and rides around terminal sprocket wheel 41 which rests on shaft 42. Individual pusher bars 43 are shown which are actuated in a transverse or lateral direction due to the action of cams 44 and 45 and wheels 46 on each pusher arm. The second cross-feed means 50 is driven by sprocket wheel 57 on shaft 58 connected to an electric drive not shown. The conveyer rides around terminal sprocket wheel 51 on shaft 52. The second cross-feed means has a unit of six pusher arms 53 which serve to laterally move across the receptacles in the buckets of conveyer 20 by the combined action of cam means 54 and wheels 59 on each pusher element. A retractable cam 55 is shown for returning the pusher arms in a lateral direction.

FIG. 2 shows, in side elevation, the arrangement of the various conveyers. Conveyer bucket means 10 extends from sprocket wheel 1 to sprocket wheel 3. Conveyer bucket means 20 extends from sprocket wheel 1 to sprocket wheel 57. First cross-feed means 40 extends from sprocket wheel 41 to sprocket wheel 3. Second cross-feed means 50 extends from sprocket wheel 51 to sprocket wheel 57. A chute means 5 is shown adjacent three flexible finger rolls 6, 7 and 8 and roll 9 with smaller flexible fingers at the initial portion of the conveyer bucket means for feeding pad-like articles P into the open receptacles of the conveyer bucket means 10 and 20.

FIG. 3 shows the cross-feed means 40 which cooperate with conveyers 10 and 20 in a top plan view. Pusher rods 43 slide within cradle assembly 48 due to the action of cam member 44 in cooperation with the wheels 46 connected to the pusher rod 43. A retractable cam means 45 returns the pusher rods. FIG. 3 also shows in more detail the conveyer bucket means 10 employing individual buckets 11 with fixed transverse walls 12 and tiltable side walls 13 on conveyer 10. Conveyer bucket means 20 is also shown with individual buckets 21 having fixed transverse walls 22 and tiltable side walls 23. The open position of the receptacles formed by tiltable walls 13 and 23 with fixed walls 12 and 22 is terminated by the action of a cam means (not shown) connected with the tiltable walls (as shown in FIG. 10).

FIG. 4 is a top plan view of the second cross-feed means 50 (of the same type as cross-feed means 40) except that the pusher rods 53 act in groups of six rods by sliding in assembly 58, the pusher rods being connected by cross members 53a and 53b. The wheel members 59 on cross-members 53b cooperate with cam means 54 to actuate the pusher rods into the cross-feed positions, and are retractable by cam member 55. Conveyer bucket means 20 is also shown in this drawing with the tiltable side walls 23 in the closed position (normal or perpendicular to the plane of conveyer travel and parallel to the fixed walls 22). The conveyer buckets are slidably connected to the conveyer chain (see FIGS. 5, 6 and 11) for lateral movement to standard packing machine bucket conveyer 30 by action of underside wheel 28 in cam track 95. This is necessary since the bulk of the frame members for the unscrambler machine and the standard packing machine bucket conveyer make it difficult to have a flanking relation between the standard packing machine bucket conveyer 30 and conveyor 20.

FIG. 5 is a detailed cross-sectional view of the conveyer bucket means 10 and 20 in the section just prior to the cross-feed means section. Individual buckets 11 are shown connected to chain conveyer 16 by pins 16a and extending brackets 17 which are fixed to the bucket 11. The chain conveyer rides on support 61 which has an extending arm 62 and supporting rails 63 for the bucket member 11 to ride on; and L members 64 with rails 65 for the chain links 16 to ride on. The support member 61 is secured to a stationary frame F′. Buckets 11 and 21 also have end supports 93 and 94 extending from the frame F′ through members 91 and 92 which keep the conveyers in line. Conveyer bucket means 10 is returned directly underneath the upper conveyer by means of downwardly extending support 67 which holds L member 68 and rail 69 for support of the conveyer chain 16. The conveyer bucket means 20 has buckets 21 which have a slide member 21b attached to bracket 27 which is attached to the chain conveyer 26 via pin 26a. The upper part of the conveyer bucket means 20 is supported by frame member F′ having upwardly extending support 71 which has extending arms 72 with rails 73 for support of the individual buckets 21. The chain conveyer rides on rails 75 which are attached to L member 74. Return means is directly under the conveyer as shown by downwardly extending support 77 with rails 78 for the conveyer 26. A guide member 28 is attached to the bucket 21 and rides in cam member 95 for slidable movement in a lateral direction toward standard packing machine bucket conveyor 30 having individual buckets 31.

FIG. 6 is another detailed cross-sectional view of the unscrambler but further down the conveyer line in the area of the second cross-feed means 50. This view is similar to that of FIG. 5 and shows pusher rods 53 slidable in assembly 58. Frame F′ has supports 81 with members 81a and 82 which hold rail members 83 against the bottom of the pusher rod assembly 58. The bracket members 57 and 57a which are fixed to the pusher rod assembly 58 and attached to conveyer chain 56 via pin 56a are shown riding on rails 85 supported by members 84 attached to the frame F′ by upstanding support 81. Return of the pusher rod assembly 58 is provided by frame member F″ having downwardly extending supports 87 with members 88 holding rails 89 for the chain conveyers 56 and 56b. The construction of the conveyer bucket means 21 shown on the right-hand side of the drawing is exactly the same as that of FIG. 5.

FIG. 7 is a side view of the initial section of conveyer bucket means 10 as the conveyer winds around initial sprocket wheel 1. Conveyer bucket 11 has end walls 11a and bottom wall 11b which are integral with the bucket and fixed transverse walls 12. The bucket 11 is connected to bucket support 17 attached to the chain conveyer 16. Tiltable side walls 13 which are L-shaped are shown located intermediate fixed side walls 12, the tiltable side walls 13 being spring biased in the open or inclined position by a coil spring attached from the bucket to the leaf 14 which is fixed to the bottom of the L-shaped wall 13 thereby leaving three receptacle areas enlarged or open and three receptacle areas closed.

Figure 8:
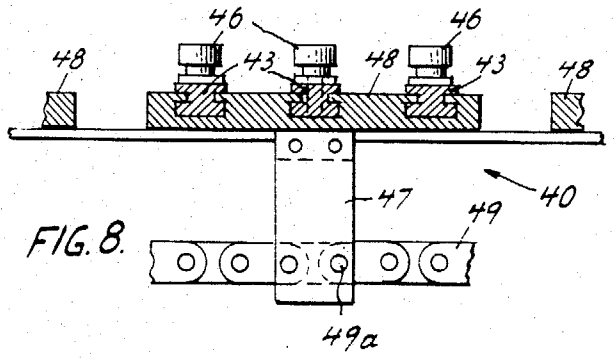
FIG. 8 is a side view of the first cross-feed means taken along lines 8—8 of FIG. 3.

FIG. 8 is a side view of a section of the first cross-feed means 40 and with pusher rods 43 slidable in cradle assembly 48 and shows chain conveyer 49 connected to assembly 48 via support 47 and pin 49a. Support 47 is fixed to assembly 48 in which three slidable individual pusher rods 43 are mounted. Assembly 48 rides on rail R and the wheels 46 on each individual pusher co-act with the cam means 44 and 45 (shown in FIG. 3) to move the pusher 43 in a lateral direction and then retract the pusher.

Figure 9:
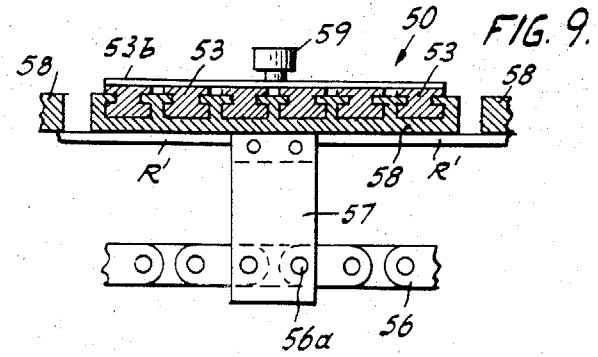
FIG. 9 is a side view of the second cross-feed means taken along line 9—9 of FIG. 4.

FIG. 9 is another side view of a section of the second cross-feed means 50 having a group of pusher rods 53 connected by cross-member 53b with upstanding pusher rod support 57 connected with chain conveyer 56 by pin 56a. Support member 57 is fixed to cradle assembly 58 which carries six pusher rods 53 as a slidably mounted unit via cross members 53b and 53a. A wheel 59 on each assembly 58 co-acts with cam means 54 and 55 (shown in FIG. 4) to actuate each unit of pusher rods 53 in a lateral direction and then retract the pushers.

FIG. 10 shows an enlarged side view of a section of conveyer bucket means 10 as the tiltable walls 13 co-act with cam means 15 to be actuated to the closed position or the position normal to plane of conveyer travel. The conveyer bucket 11a is shown with the L-shaped tiltable wall 13 in the inclined or slanted position due to the action of leaf 14 which is spring-loaded to the bucket 10 and connected to the bottom portion 13f of wall 13. Leaf 14 connects with a downwardly extending fixed arm 13a normal to the plane of the leaf 14 and parallel to wall 13. Arm 13a has a fixed arm 13b and movable arm 13d connected by cross-member 13c which is parallel to arm 13a. Member 13d is ordinarily at an angle greater than 90° with respect to 13a due to the action of spring 13e. However, contact with cam member 15 reduces this angle to 90° and overcomes the action of leaf spring 14 to actuate wall 13 to the closed or perpendicular position.

FIG. 11 is another side view of a section of conveyer bucket means 20. The individual bucket 21 has integral side walls 21a and member 21b connected to the bucket 21. Member 21b is slidable within member 27b which is attached to upstanding support 27 of conveyer chain 26. This view shows the movable side walls 23 in their normal inclined or slanted position due to the action of leaf spring 24 on portion 23f of wall 23. In this view, the downwardly extending arm or spring biased member which cooperated with cam means 15 is not shown but it is exactly the same as that shown in FIG. 10.

Having described the structural features of the unscrambler machine, operation of the machine will be described in regard to steel wool scouring pads. However, it is clear that the machine can be used to orient three-dimensional articles of any type, as long as such articles are relatively symmetrical in shape and have a cross-sectional dimension which is either flat or oval thus allowing these articles to be laterally aligned in this dimension in each open receptacle merely due to a gravity feed. Referring to FIGS. 1 and 2, it is seen that the scouring pads P which preferably have been flattened in their cross-sectional dimension by passage through rollers (not shown) is supplied to the unscrambler machine in a continuous but random manner via chute means 5 as the conveyers 10 and 20 wind around initial sprocket wheel 1. At this point, the buckets 11 and 21 of the respective conveyers have three transverse receptacles of each bucket in the open or inclined position as shown in more detail in FIGS. 7 and 11. The inclined position of tiltable walls 13 while enlarging the openings of three receptacles is seen to completely close the openings of the three adjacent receptacles intermediate the open receptacles. As the pads P are fed individually to the bottom of chute means 5 they easily fall by gravity into an upright or upstanding position in the three inclined receptacles formed by fixed walls 11a and 12 with movable walls 13 due to the action of spring loaded leaf 14 upon tiltable wall 13. Pads which do not directly fall into the open receptacle are moved in by the counter-rotating fingers 6, 7, 8 and 9 which also serve to remove excess pads which merely lie on the top of filled receptacles. It can also be seen by reference to FIGS. 1 and 3 that the individual scouring pads are laterally aligned in their smallest dimension in each open receptacle of the conveyer buckets 11 and 21 and that these open receptacles are laterally offset from each other. The result of this lateral offset is that the tiltable walls 13 will, upon assuming the closed or perpendicular position to the conveyer, travel (as shown in FIG. 10) by contact of downwardly extending arm 13c of wall 13 with cam means 15, that the empty receptacles will be laterally aligned with the filled receptacle in the corresponding flanking conveyer. Since the two conveyers 10 and 20 move at the same speed (as does cross-feed means 40 and 50) the spaced rows of laterally aligned articles can easily be moved from two columns of spaced and laterally offset rows into one column of laterally aligned rows which are not spaced (as shown in more detail in FIG. 3) by the action of individual pusher rods 43 moving in a lateral direction across conveyer 10 as the two conveyers 10 and 20 and cross-feed means 40 move in unison. Once the spaced rows of pads in the closed receptacles of buckets 11 of conveyer 10 are pushed into the empty receptacles of buckets 21 of conveyer 20 the individual pusher rods are retracted by the action of cam means 45 and wheel 46.

Once the scouring pads are aligned into compact groups with all six receptacles on each of the buckets 21 of conveyer 20 being filled (six rows, three across, to give 18 pads), the group of scouring pads in each bucket is ready for transfer onto a conventional standard packing machine bucket conveyer 30 having laterally open channel shaped buckets 31 which are empty and without receptacle walls. To do this most effectively, a group of pusher rods 53 on the second cross-feed means 50 is used as shown in FIG. 4. Also, as best shown in FIGS. 4 and 6, the conveyer bucket means 20 must be laterally displaced toward the standard packing machine bucket conveyer since the bulk of the frame members for the standard packing machine bucket conveyer 30 and the unscrambler does not permit a flanking relationship between these two conveyers. To accomplish this flanking relationship, a conventional cam means 95 is used with a cooperating wheel member 28 which rides within this cam and extends from bucket 21. This cam action cooperates with a slidable bucket means 21b and 27b (shown in FIGS. 5, 6 and 11) to accomplish lateral displacement. The pusher rods 53 of the second cross-feed means 50 operate as a unit of six pusher members to laterally move or push six rows of laterally aligned scouring pads (three across) onto the empty buckets 31 of the standard packaging machine bucket conveyer 30.

In this apparatus, it is believed that the offset feature of the two conveyers and the operation of the tiltable walls which are normally in the open position but close after reception of the pad-like articles in preparation for the meshing operation into one column are essential. It should be noted that while the spring loaded tiltable walls can be closed by operation of cam means 15 with [extending] movable arm 13 [c] *d* (as shown in FIG. 10) that in the case where a foreign object (too large for the tiltable walls to close) falls into one of the open receptacles that the action of spring 13e will [cause] *permit* connecting arm 13c [not] to move up through fixed arm 13b [but due to the action of spring 13e will cause arm 13d to remain in the slanted position,] *as the arm 13d moves to an acute angle relationship with arm 13e upon contact with cam 15,* thus [keeping] *permitting the affected* tiltable wall 13 *to remain* in the slanted or open position while the remaining tiltable walls will all close to the perpendicular position.

In the drawings, the scouring pads P are shown oriented in the various receptacles with some space between the side walls 12 and 13 (FIG. 10). In actual practice, the pads are oriented in a snug manner with the walls 12 and 13 actually touching the side of the pad.

What is claimed is:

1. A machine for arranging three-dimensional, pad-like articles in upstanding groups which comprises feeder means for supplying *in random fashion* individual *pad-like* articles, [to a pair of] flanking conveyers moving in parallel relation *positioned to receive pad-like articles from said feeder means,* said flanking conveyers [having] *comprising* a series of laterally open channel shaped buckets which extend the length of the conveyer for receiving groups of articles, said individual buckets extending the width of the conveyer, a series of *open topped and* laterally open rectangular receptacles in each bucket which extend the width of the conveyer bucket, said receptacles being formed by transverse fixed walls secured perpendicular to the bucket base, tiltable walls located intermediate the fixed walls and movably secured to the bucket base, said tiltable walls being normally in a slanted position wherein the *top* opening in one rectangular receptacle is enlarged while the *top* opening in the adjacent receptacle is *substantially* closed, *whereby pad-like articles are deposited by said feeder means into said receptacles having enlarged top openings in upstanding rows laterally aligned in regard to the smallest dimension of the pad-like articles,* the buckets in [each] *one* flanking conveyer being sufficiently offset *from those of the other* to align the [open] receptacles in one conveyer *whose top openings are enlarged* with *those in* the *other conveyer whose top openings are substantially* closed [receptacle in the other conveyer], *said tiltable walls being movable to a perpendicular position wherein the top opening of one receptacle contiguous to a tiltable wall is substantially the same size as that of the other receptacle contiguous to said tiltable wall,* means for moving said tiltable walls from *said* [a] slanted position to *said* [a] perpendicular position after *deposit* [reception] of [upstanding rows of] articles [laterally aligned in regard to their smallest dimension] in*to* the open receptacles, means for moving the [spaced and laterally offset rows in the] pair of conveyers at the same speed, cross-feed means *operable when said tiltable walls are in said perpendicular position* for laterally transferring [the spaced rows of] articles from receptacles in [the buckets of] one conveyer into the empty receptacles [in the buckets] of the flanking conveyer to provide one column of aligned rows and [means] for discharging said aligned rows of articles from the *receptacles* [buckets] of the filled conveyer, and means for moving said cross-feed means *in the same direction and* at the same speed as the flanking conveyers.

2. The machine of claim 1 wherein the tiltable walls are L-shaped, the bottom of said L-shaped walls having spring means attached to the bottom wall of said buckets and downwardly extending arms protruding through openings in the bottom wall of said buckets, and cam means extending beneath the conveyer buckets along the path of travel of said buckets for actuating said tiltable walls from the spring loaded open position to the cam operated closed position wherein the tiltable walls are perpendicular to the bottom wall of the buckets and the plane of conveyer travel.

3. The machine of claim 2 wherein the downwardly extending arms of the tiltable walls each have a first and second arm which extends laterally from said downwardly extending arm, said first arm being pivoted to the terminal portion of said downwardly extending arm while the second arm is located intermediate said first arm and said bucket means and permanently fixed to and perpendicular to said downwardly extending arm, a connecting arm for said first and second arms, and spring means attached to said connecting arm for actuating said first arm in an outward direction to form an oblique angle with the downwardly extending arm and pressing against the cam means when said first arm contacts the cam means.

4. The machine of claim 3 wherein the flanking conveyers and cross-feed means include laterally spaced moving chains parallel to one another, cradle members with pushers carried by a pair of said chains, said pushers being in lateral alignment with the filled receptacles and the empty receptacles of said flanking conveyers, and cam means for laterally projecting and retracting said pushers during travel of said chains for gradually moving the aligned articles out of the receptacles of one flanking conveyer into the other conveyer.

5. The machine of claim 4 wherein the flanking conveyer bucket means are of uneven length, a second cross-feed means is provided for discharging the filled buckets of the longer conveyer onto a packing conveyer bucket means and means are provided for moving said cross-feed means at the same speed as the flanking conveyer and the packaging conveyer.

6. The machine of claim 5 wherein the buckets of the packaging conveyer and the buckets of the longer flanking conveyer are laterally aligned and second cross-feed means are provided for laterally transferring the articles in the filled buckets of the flanking conveyer to the empty buckets of the packaging conveyer.

7. The machine of claim 6 wherein the second cross-feed means include laterally spaced moving chains, a cradle member carried by said chains in lateral alignment with the buckets of both said flanking conveyer and said packaging conveyer, pusher means slidably mounted in said cradle member, and cam means for projecting and retracting said pusher means during travel of said chain for gradually moving the aligned group of articles out of the buckets of said flanking conveyer onto the buckets of said packaging conveyer during travel thereof.

*8. A machine adapted to arrange in upstanding attitude three dimensional, pad-like articles supplied thereto in random orientation, said machine comprising in combination longitudinally movable conveyer means comprising juxtaposed first and second parallel rows of open-topped and open-ended receptacles, the receptacles in each of said rows being defined by a plurality of spaced transversely extending upstanding walls and a plurality of transversely extending tiltable walls positioned respectively intermediate said upstanding walls, said tiltable walls having a substantially upright position wherein said tiltable walls are substantially parallel with and equidistant from the adjacent upstanding walls in the same row and the top and end openings of transversely and longitudinally adjacent receptacles are substantially the same size and the end openings of transversely adjacent receptacles are aligned, said tiltable walls being movable toward an inclined position wherein the top opening of one receptacle contiguous thereto is enlarged permitting movement of pad-like articles thereinto and the top opening of the other receptacle contiguous thereto is reduced to a size preventing movement of any of said pad-like articles thereinto, the tiltable walls of said first row being transversely aligned with upstanding walls of said second row such that when the tiltable walls are in their inclined positions, receptacles in said first row whose top opening is reduced are aligned with receptacles in said second row whose top opening is enlarged and receptacles in said first row whose top opening is enlarged are aligned with receptacles in said second row whose top opening is reduced, and means for moving said tiltable walls to said inclined and upright positions, whereby after movement of said pad-like articles into said receptacles and movement of said tiltable walls to an upright position, said pad-like articles in receptacles in said second row are transversely aligned with unoccupied receptacles in said first row and may be moved thereinto.*

*9. A combination according to claim 8 including pusher means cooperable with said conveyor means when said tiltable walls are in upright position and adapted to push pad-like articles in receptacles of said second row transversely into aligned unoccupied receptacles of said first row and thereafter, to simultaneously push pad-like articles end-wise out of a predetermined number of serially related receptacles in said first row.*

*10. A machine adapted to arrange in upstanding attitude three dimensional, pad-like articles, said machine comprising in combination feeder means for supplying in random fashion pad-like articles, longitudinally movable conveyer means positioned to receive pad-like articles from said feeder means and comprising juxtaposed first and second parallel rows of open-topped and open-ended receptacles, the receptacles in each of said rows being defined by a plurality of spaced transversely extending upstanding walls and a plurality of transversely extending tiltable walls positioned respectively intermediate said upstanding walls, said tiltable walls having a substantially upright position wherein said tiltable walls are substantially parallel with and equidistant from the adjacent upstanding walls in the same row and the top and end openings of transversely and longitudinally adjacent receptacles are substantially the same size and the end openings of transversely adjacent receptacles are aligned, said tiltable walls being movable toward an inclined position wherein the top opening of one receptacle contiguous thereto is enlarged permitting movement thereinto of pad-like articles from said feeder means and the top opening of the other receptacle contiguous thereto is reduced to a size preventing movement of any of said pad-like articles thereinto, the tiltable walls of said first row being transversely aligned with the upstanding walls of said second row such that when the tiltable walls are in their inclined positions, receptacles in said first row whose top opening is reduced are aligned with receptacles*

*in said second row whose top opening is enlarged and receptacles in said first row whose top opening is enlarged are aligned with receptacles in said second row whose top opening is reduced, means for moving said tiltable walls to said inclined and upright positions, pusher means cooperable with said conveyer means when said tiltable walls are in upright position for pushing pad-like articles in receptacles of said second row transversely into aligned unoccupied receptacles of said first row and thereafter, to simultaneously push pad-like articles end-wise out of a predetermined number of serially related receptacles in said first row.*

References Cited

The following references, cited by the Examiner, are of record in the patented file of this patent or the original patent.

UNITED STATES PATENTS

| | | | |
|---|---|---|---|
| 2,634,737 | 4/1953 | Rowe | 198—179 |
| 2,667,958 | 2/1954 | Malhiot | 198—179 |
| 3,191,751 | 6/1965 | Griner | 198—32 X |
| 3,219,167 | 11/1965 | Boinnard | 198—32 |
| 3,250,372 | 5/1966 | Wagner et al. | 198—30 |

RICHARD E. AEGERTER, Primary Examiner

U.S. Cl. X.R.

118—131